United States Patent
Melanson et al.

(10) Patent No.: US 9,484,832 B2
(45) Date of Patent: Nov. 1, 2016

(54) ISOLATION OF SECONDARY TRANSFORMER WINDING CURRENT DURING AUXILIARY POWER SUPPLY GENERATION

(71) Applicant: KONINKLIJKE PHILIPS N.V., Eindhoven (NL)

(72) Inventors: John L. Melanson, Austin, TX (US); Prashanth Drakshapalli, Austin, TX (US); Siddharth Maru, Austin, TX (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 599 days.

(21) Appl. No.: 13/715,451

(22) Filed: Dec. 14, 2012

(65) Prior Publication Data

US 2013/0155728 A1 Jun. 20, 2013

Related U.S. Application Data

(60) Provisional application No. 61/570,554, filed on Dec. 14, 2011.

(51) Int. Cl.
*H02M 3/335* (2006.01)
*H02M 7/217* (2006.01)
(Continued)

(52) U.S. Cl.
CPC ........... *H02M 7/217* (2013.01); *H02M 1/4258* (2013.01); *H02M 1/44* (2013.01); *H02M 3/33507* (2013.01); *H02M 3/33523* (2013.01);
(Continued)

(58) Field of Classification Search
CPC .................. H02M 2001/006; H02M 3/33576; H02M 3/33561
See application file for complete search history.

(56) References Cited

U.S. PATENT DOCUMENTS

| 4,683,529 A | 7/1987 | Bucher |
| 5,014,178 A | 5/1991 | Balakrishnan |

(Continued)

FOREIGN PATENT DOCUMENTS

| CN | 1292598 A | 4/2001 |
| CN | 201025693 | 2/2008 |

(Continued)

OTHER PUBLICATIONS

Amanci, Adrian et al, Synchronization System with Zero-Crossing Peak Detection Algorithm for Power System Applications, 2010 International Power Electronics Conference, pp. 2984-2991, 2010.

(Continued)

*Primary Examiner* — Harry Behm

(57) ABSTRACT

An electronic system and method include a controller to actively control power transfer from a primary winding of a switching power converter to an auxiliary-winding of an auxiliary power supply. The switching power converter is controlled and configured such that during transfer of power to the auxiliary-winding, the switching power converter does not transfer charge to one or more secondary-windings of the switching power converter. Thus, the switching power converter isolates one or more secondary transformer winding currents from an auxiliary-winding current. By isolating the charge delivered to the one or more secondary-windings from charge delivered to the auxiliary-winding, the controller can accurately determine an amount of charge delivered to the secondary-windings and, thus, to a load.

20 Claims, 5 Drawing Sheets

(51) Int. Cl.
*H05B 33/08* (2006.01)
*H02M 1/44* (2007.01)
*H02M 5/257* (2006.01)
*H05B 37/02* (2006.01)
*H02M 1/42* (2007.01)
*H02M 1/00* (2006.01)

(52) U.S. Cl.
CPC ....... *H02M 5/2576* (2013.01); *H05B 33/0815* (2013.01); *H05B 33/0845* (2013.01); *H05B 37/02* (2013.01); *H02M 3/33561* (2013.01); *H02M 3/33576* (2013.01); *H02M 2001/0006* (2013.01); *H02M 2001/0048* (2013.01); *Y02B 20/346* (2013.01); *Y02B 20/347* (2013.01); *Y02B 70/126* (2013.01); *Y02B 70/1491* (2013.01)

(56) References Cited

U.S. PATENT DOCUMENTS

| | | |
|---|---|---|
| 5,285,369 A * | 2/1994 | Balakrishnan .............. 363/49 |
| 5,319,301 A | 6/1994 | Callahan |
| 5,321,350 A | 6/1994 | Haas |
| 5,479,333 A | 12/1995 | McCambridge et al. |
| 5,581,453 A | 12/1996 | Ueta et al. |
| 5,770,928 A | 6/1998 | Chansky et al. |
| 5,812,383 A | 9/1998 | Majid et al. |
| 5,812,385 A | 9/1998 | Leu |
| 5,834,858 A | 11/1998 | Crosman et al. |
| 5,874,725 A | 2/1999 | Yamaguchi |
| 5,880,942 A | 3/1999 | Leu |
| 5,901,051 A | 5/1999 | Takahashi |
| 6,043,635 A | 3/2000 | Downey |
| 6,125,046 A | 9/2000 | Jang et al. |
| 6,134,123 A | 10/2000 | Yamada |
| 6,160,724 A | 12/2000 | Hemena et al. |
| 6,172,883 B1 * | 1/2001 | Kates et al. ............. 363/21.18 |
| 6,181,114 B1 | 1/2001 | Hermena et al. |
| 6,369,525 B1 | 4/2002 | Chang et al. |
| 6,646,848 B2 | 11/2003 | Yoshida et al. |
| 6,839,247 B1 | 1/2005 | Yang et al. |
| 6,842,353 B2 | 1/2005 | Yamada |
| 6,912,140 B2 | 6/2005 | Kasai et al. |
| 6,963,496 B2 | 11/2005 | Bimbaud |
| 6,980,446 B2 | 12/2005 | Simada et al. |
| 7,012,818 B2 | 3/2006 | Kotsuji et al. |
| 7,064,531 B1 | 6/2006 | Zinn |
| 7,099,163 B1 | 8/2006 | Ying |
| 7,106,603 B1 | 9/2006 | Lin et al. |
| 7,136,292 B1 | 11/2006 | Chan et al. |
| 7,184,937 B1 | 2/2007 | Su |
| 7,221,128 B2 | 5/2007 | Usui et al. |
| 7,345,458 B2 | 3/2008 | Kanai et al. |
| 7,352,595 B2 | 4/2008 | Yang et al. |
| 7,394,668 B2 | 7/2008 | Nakajima |
| 7,394,670 B2 | 7/2008 | Koike |
| 7,468,896 B2 | 12/2008 | Gong et al. |
| 7,606,532 B2 | 10/2009 | Wuidart |
| 7,684,223 B2 | 3/2010 | Wei |
| 7,843,017 B2 | 11/2010 | Cheng |
| 8,008,898 B2 | 8/2011 | Melanson et al. |
| 8,031,494 B2 | 10/2011 | Brkovic |
| 8,169,803 B2 | 5/2012 | Huang et al. |
| 8,279,631 B2 | 10/2012 | Yang |
| 8,305,001 B2 | 11/2012 | Horiuchi et al. |
| 8,325,502 B2 | 12/2012 | Gaombanco et al. |
| 8,379,414 B2 | 2/2013 | Huang et al. |
| 8,461,818 B1 | 6/2013 | Benes |
| 2003/0174520 A1 | 9/2003 | Bimbaud |
| 2004/0240233 A1 | 12/2004 | Disney |
| 2005/0088862 A1 | 4/2005 | Simada et al. |
| 2006/0126368 A1 | 6/2006 | Rapeanu |
| 2006/0285365 A1 | 12/2006 | Huynh et al. |
| 2007/0103134 A1 | 5/2007 | Yang et al. |
| 2007/0121350 A1 * | 5/2007 | Duvnjak ................ 363/21.01 |
| 2007/0159856 A1 | 7/2007 | Yang |
| 2008/0101098 A1 | 5/2008 | Disney |
| 2008/0304293 A1 | 12/2008 | Spiridon et al. |
| 2009/0135632 A1 | 5/2009 | Sohma |
| 2009/0190379 A1 | 7/2009 | Melanson et al. |
| 2010/0213859 A1 | 8/2010 | Shteynberg et al. |
| 2010/0271850 A1 | 10/2010 | Huang et al. |
| 2010/0309689 A1 | 12/2010 | Coulson |
| 2010/0327838 A1 | 12/2010 | Melanson |
| 2011/0018590 A1 | 1/2011 | Tai et al. |

FOREIGN PATENT DOCUMENTS

| | | |
|---|---|---|
| CN | 2012025693 | 2/2008 |
| DE | 10001394 A1 | 7/2001 |
| EP | 0585789 A | 3/1994 |
| EP | 1289107 A2 | 3/2003 |
| GB | 2468239 B | 5/2010 |
| WO | 2007016373 A1 | 2/2007 |
| WO | 2010035155 A2 | 1/2010 |

OTHER PUBLICATIONS

International Search Report, PCT/US2012/069843, European Patent Office, Jun. 24, 2014, pp. 1-5.
Written Opinion, PCT/US2012/069843, European Patent Office, Jun. 24, 2014, pp. 1-8.
Kim, Tae-Noon; Lee, Sang-Noon, Yang; Joon-Hyun; Im, Chang-Soon; Hyun, Dong-Seok; Kim, Rae-Young; A Low Cost Multiple Current-Voltage Concurrent Control for Smart Lighting Applications; IECON 2011—37th Annual COnference on IEEE Industrial Electronics Society; IEEE; Nov. 7, 2011; pp. 2866-2871, Department of Electrical Engineering, Hyang University, Seoul, Korea.
Hu,Yue-Quan; Zhang, Jun; Chen, Wei; Wen, Chau-Chun; Mathematical Modeling of Cross-Regulation Problem in Flyback Converters; 32nd Annual IEEE Power Electronics Specialists Conference; 2001 Conference Proceedings:Vancouver, Canada; IEEE; Jun. 17, 2001; pp. 2072-2077, Delta Power Electronics Center, Shanghai, P. R. China.
Zhang, Jun and Lu, Dylan Dah-Chuan; A Novel Single Stage Power Factor Correction Scheme with Time-Multiplexing Control; Proceedings of the International Conference on Industrial Electronics Control and Instrumentation: Taipei, Taiwan; IEEE; Nov. 5, 2007; pp. 1432-1437; School of Electrical and Information Engineering; The University of Sydney.
International Preliminary Report on Patentability, PCT/US2012/069843, European Patent Office, Jul. 10, 2014, pp. 1-9.
Beaty, et al. (Eds.), Standard Handbook for Electrical Engineers, 15th Edition, pp. 1-3, 2007, New York City, New York, USA.
Mammano, Bob, "Current Sensing Solutions for Power Supply Designs", pp. 1-36, 2001.
Power Integrations, Inc. TOP200-4/14 Datasheet, TOPSwitch Family Three-terminal Offline PWM Switch, pp. 1-16, 1994, Sunnyvale, CA, USA.
Wang, Meizhong, "Understandable Electric Circuits", Institution of Engineering, 2010, London, United Kingdom.
Response to the Written Opinion as filed in Application No. 12818706.9 on Mar. 27, 2015, European Patent Office, pp. 1-16.

* cited by examiner

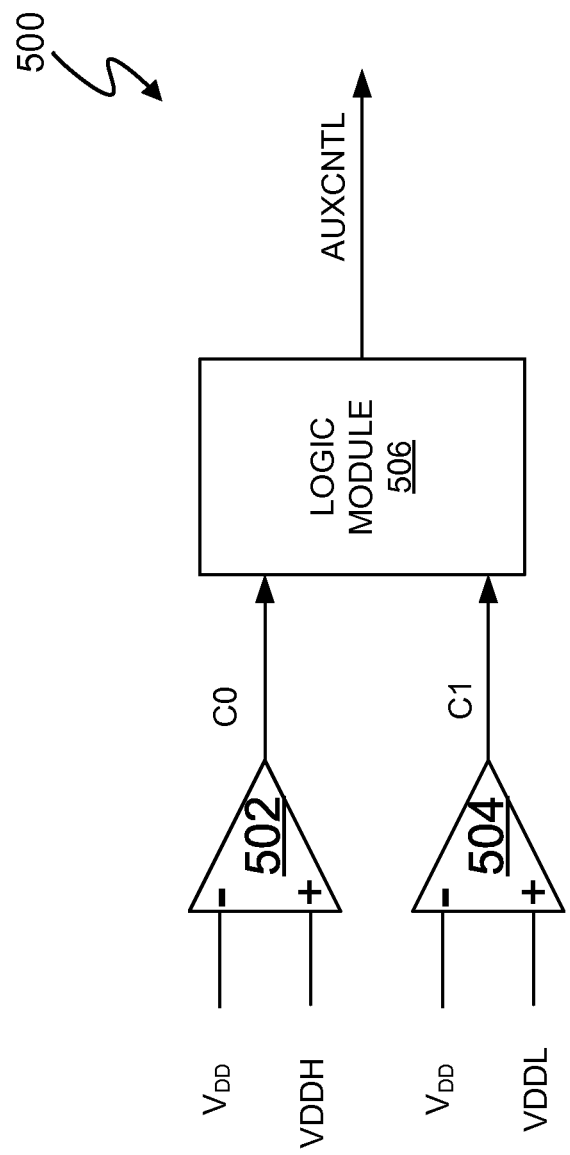

ISOLATION OF SECONDARY TRANSFORMER WINDING CURRENT DURING AUXILIARY POWER SUPPLY GENERATION

CROSS-REFERENCE TO RELATED APPLICATION

This application claims the benefit under 35 U.S.C. §119 (e) and 37 C.F.R. §1.78 of U.S. Provisional Application No. 61/570,554, filed on Dec. 14, 2011, which is incorporated by reference in its entirety.

BACKGROUND OF THE INVENTION

1. Field of the Invention

The present invention relates in general to the field of electronics, and more specifically to a system and method for isolating secondary transformer winding current during auxiliary power supply generation with an auxiliary-winding of the transformer.

2. Description of the Related Art

Many electronic systems include circuits, such as switching power converters to provide efficient power conversion from a voltage supply into a regulated output voltage. Often, a controller controls the power conversion process of a switching power converter. The switching power converter converts input power from a supply voltage source into an amount of output power utilized by a load. The controller utilizes a supply voltage derived from the same supply voltage being converted by the switching power converter.

FIG. 1 depicts a flyback-type switching power converter 100 that converts the input voltage $V_{IN}$ into a constant current $i_S$ and load voltage $V_{LD}$ on the side of the secondary-winding 116 of the transformer 112 and to a converter supply voltage $V_{DD}$ on the side of the auxiliary-winding 124. In at least one embodiment, the input voltage $V_{IN}$ is a rectified nominally 60 Hz/110 V line voltage in the United States of America or a nominally 50 Hz/220 V line voltage in Europe and the People's Republic of China. The controller 102 generates a switch control signal CNTRL to control the flyback-type, switching power converter 104. The control signal CNTRL controls the conductivity of field effect transistor (FET) switch 106 to control the primary current $i_P$ to meet the power demands of load 108. For an n-channel FET, the FET conducts (i.e. ON) when the switch control signal CNTRL is a logical one and is nonconductive (i.e. OFF) when the switch control signal CNTRL is a logical zero.

When the FET 106 conducts, the primary current $i_P$ ramps up through the primary winding 110 of transformer 112. The dot convention of transformer 112 and the diode 114 prevent flow of the secondary current $i_S$ from the secondary-winding 116 when FET 106 conducts and the primary current $i_P$ is flowing into the primary winding 110. When the controller 102 generates the switch control signal CNTRL to turn FET 106 OFF, the primary current $i_P$ falls to 0, and the voltage across the primary winding 110 reverses (also referred to as "flyback"). During the flyback, the secondary current $i_S$ quickly rises and charges capacitor 118. Capacitor 118 provides an output voltage $V_{LD}$ and current to the load 108. The load can be any type of load including one or more light emitting diodes. A diode and resistor-capacitor filter circuit 120 provides a path for voltage perturbations.

After the switching power converter 104 begins operation, an auxiliary power supply 122 provides the supply voltage $V_{DD}$ for controller 102. The auxiliary power supply 122 includes an auxiliary-winding 124 with the same dot convention as the secondary-winding 116. The FET 126 is biased by a fixed gate voltage $V_G$ to conduct the auxiliary current $i_{AUX}$ through diode 130 and resistor 132 to the $V_{DD}$ voltage node. When the controller supply voltage $V_{DD}$ falls below the gate voltage $V_G$ minus a threshold voltage $V_{TH}$ of the FET 126, the FET 126 conducts and charges the $V_{DD}$ node, which charges capacitor 128. When the voltage $V_{DD}$ reaches $V_G+V_{TH}$, the FET 126 stops conducting. Capacitor 128 stores energy to assist in providing a relatively constant value of the controller supply voltage $V_{DD}$.

The controller supply voltage $V_{DD}$ varies in accordance with varying power demands by controller 102. Thus, the auxiliary power supply 126 provides power to the controller 102 in accordance with the varying power demands of controller 102. When the auxiliary power supply 126 provides charge to the capacitor 128, the auxiliary power supply 126 takes charge from the primary winding 110 that would otherwise be provided to the secondary-winding 116. Since the power demands of the auxiliary power supply 122 are not monitored, the amount of power actually delivered to the secondary-winding 116 and, thus, the load 108 is not accurately known.

SUMMARY OF THE INVENTION

In one embodiment of the present invention, a method includes transferring energy from a primary winding of a transformer of a switching power converter to a secondary-winding and to an auxiliary-winding for an auxiliary power supply during mutually exclusive periods of time. The transferring of energy includes at least controlling a first value of a reflected voltage of the auxiliary-winding of the transformer to be lower than a reflected voltage of the secondary-winding of the transformer during transfer of energy to the auxiliary-winding. The transferring of energy also includes controlling a second value of the reflected voltage of the auxiliary-winding of the transformer to be greater than the reflected voltage of the secondary-winding of the transformer during transfer of energy to the secondary-winding.

In another embodiment of the present invention, an apparatus includes a controller to at least control a transfer of energy from a primary winding of a transformer to a secondary-winding of a switching power converter and to an auxiliary-winding for an auxiliary power supply during mutually exclusive periods of time. To control the transfer of energy, the controller is configured to at least control a first value of a reflected voltage of the auxiliary-winding of the transformer to be lower than a reflected voltage of the secondary-winding of the transformer during transfer of energy to the auxiliary-winding. To control the transfer of energy, the controller is further configured to control a second value of the reflected voltage of the auxiliary-winding of the transformer to be greater than the reflected voltage of the secondary-winding of the transformer during transfer of energy to the secondary-winding.

In a further embodiment of the present invention, an apparatus includes a flyback type switching power converter. The switching power converter includes a transformer having a primary-winding, a secondary-winding, and an auxiliary-winding. The apparatus further includes a first switch coupled to the primary-winding and an auxiliary power supply that includes auxiliary power supply control circuitry coupled to the primary-winding. The apparatus further includes a controller coupled to the first switch to (i) control the switch and current in the primary-winding and (ii) control the auxiliary power supply circuitry to isolate a transfer of energy from the primary-winding to the secondary-winding from a transfer of energy from the primary-winding to the secondary-winding.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 5 depicts an embodiment of auxiliary power supply control circuitry.

DETAILED DESCRIPTION

An electronic system and method include a controller to actively control power transfer from a primary winding of a switching power converter to an auxiliary-winding of an auxiliary power supply. The switching power converter is controlled and configured such that during transfer of power to the auxiliary-winding, the switching power converter does not transfer charge to one or more secondary-windings of the switching power converter. Thus, the switching power converter isolates one or more secondary transformer winding currents from an auxiliary-winding current. By isolating the charge delivered to the one or more secondary-windings from charge delivered to the auxiliary-winding, the controller can accurately determine an amount of charge delivered to the secondary-windings and, thus, to a load.

Figure 1:
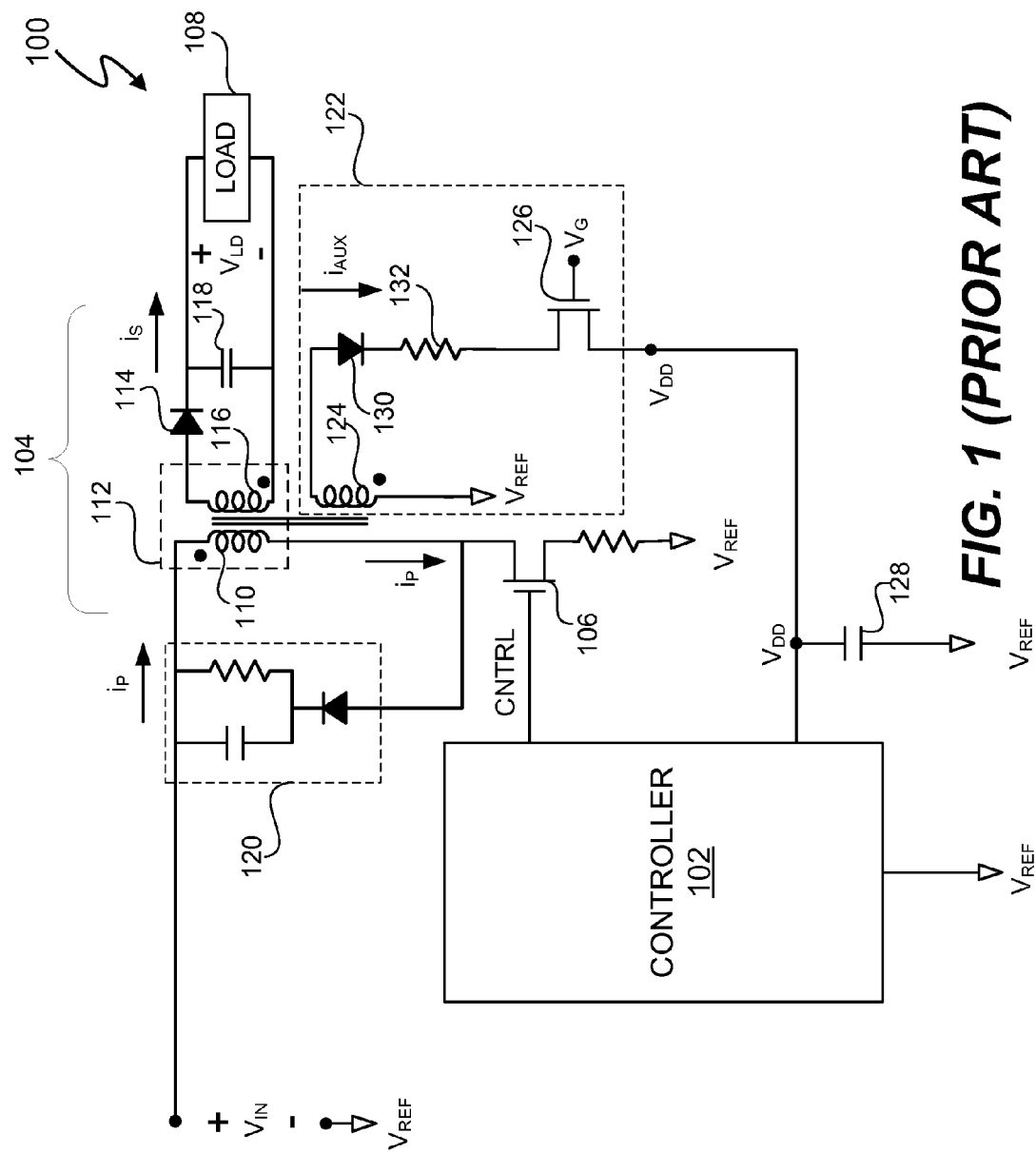
FIG. 1 (labeled prior art) depicts a flyback-type switching power converter and an auxiliary power supply.
Figure 2:
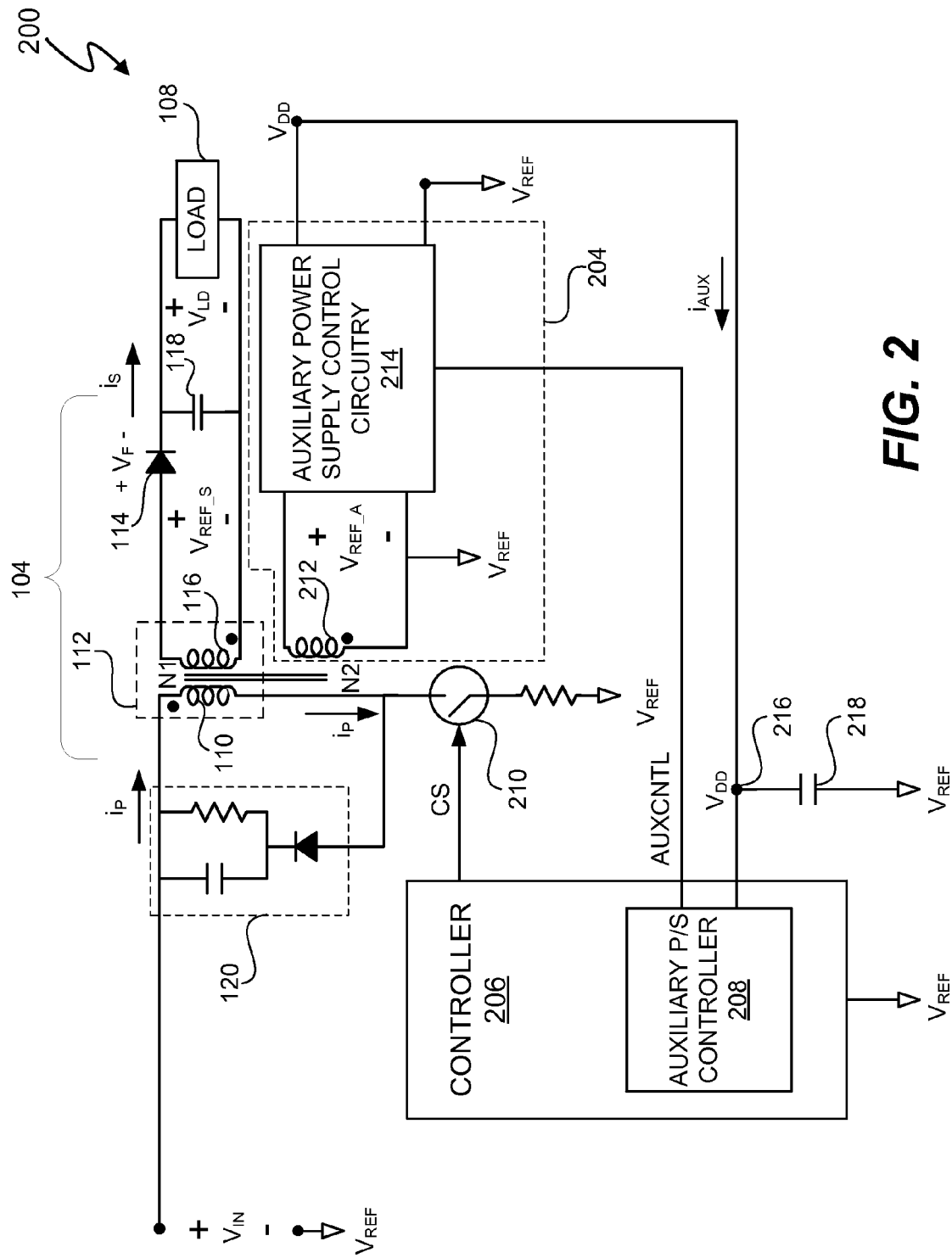
FIG. 2 depicts an electronic system having an actively controlled auxiliary power supply with secondary transformer winding current isolation during auxiliary power supply power generation.

FIG. 2 depicts an electronic system 200 having an actively controlled auxiliary power supply 204 with secondary transformer winding current $i_S$ isolation during auxiliary power supply power generation. The electronic system 200 includes the flyback-type switching power converter 104, which functions as previously described. The electronic system 200 also includes an actively controllable auxiliary power supply 204 that supplies power to the controller 206. The auxiliary power supply 204 is "actively controllable" because the auxiliary power supply controller 208 controls when the auxiliary power supply 204 generates and does not generate power. In at least one embodiment, an auxiliary power supply controller 208 controls power generation by the auxiliary power supply 204 by generating a control signal AUXCNTL that controls when the auxiliary power supply 204 generates power. In at least one embodiment, the auxiliary power supply controller 208 is incorporated into controller 206; although whether the auxiliary power supply controller 208 is integrated as part of the controller 206 or separate from the controller is a matter of design choice.

In at least one embodiment, the controller 206 operates to control transfer of a known, average quantity of charge to the load 108 during a period of time. The average quantity of charge to be delivered to the load 108 can change over time. For example, the controller 206 may be instructed, such as by a dimmer (e.g. dimmer 304 in FIG. 3), to modify the average quantity of charge provided to the load 108. For example, in at least one embodiment, the input voltage $V_{IN}$ is a rectified, time-varying (AC) voltage that can be modified, such as with a dimmer. When the input voltage $V_{IN}$ is modified, a particular response by the load 108, such as dimming of a lamp, is expected. To achieve a particular static and dynamic response of the load 108, the controller 206 operates to precisely as possible control the charge delivered to the load 108.

However, the switching power converter 104 does not deliver all charge to the load 108. The primary-side winding 110 delivers charge to both the secondary-winding 116 and the auxiliary-winding 212. Thus, in at least one embodiment, to precisely determine the amount of charge the switching power converter 104 delivers to the load 108, in at least one embodiment, the controller 206 ensures that the times when charge is delivered to the secondary-winding 116 and to the auxiliary-winding 212 are known and mutually exclusive. The auxiliary power supply controller 208 and the actively controllable auxiliary power supply 204 allow the controller 206 to isolate the charge transferred to the load 108 from the charge transferred to the auxiliary power supply 204. By isolating the charge deliveries, the amount of charge transferred to the load 108 is not affected by the amount of charge transferred to the auxiliary power supply 204, and the controller 206 can, thus, determine the amount of charge the switching power converter 104 delivers to the load 108.

To isolate the charge transfer between the secondary-winding 116 and the auxiliary-winding 212, in at least one embodiment, the controller 206 controls mutually exclusive times for the transfer of energy from the primary-winding 110 of the transformer 112 to the secondary-winding 116 and to the auxiliary-winding 212 for the auxiliary power supply 204. For example, during a first period of time, the controller 206 controls the transfer of energy from the primary-winding 110 of the transformer 112 to the secondary-winding 116. During a second period of time, the controller 206 actively controls transfer of energy from the primary-winding 110 to the auxiliary-winding 212 without transferring any energy to the secondary-winding. In at least one embodiment, the system 200 achieves an isolation between transfer of energy to the secondary-side winding 116 and to the auxiliary-winding 212 by ensuring that a value of a reflected voltage $V_{REF\_S}$ across the secondary-winding 116 is greater than a value of a reflected voltage $V_{REF\_A}$ across the auxiliary-winding 212 when transferring energy to the auxiliary-winding 212 and, conversely, by providing a high impedance current path for an auxiliary current $i_{AUX}$ when transferring energy to the secondary-winding 212.

The controller 206 generates a control signal CS to control switch 210 and, thereby, control flow of primary-side current $i_P$ into the primary-side coil 110. In at least one embodiment, the switch 210 is a FET. When switch 210 conducts, the primary-side current $i_P$ energizes primary-side winding 110, and when switch 210 stops conducting, the polarity of the voltage across the primary-side winding reverses and will begin to ramp down as energy is transferred to either the secondary-winding 116 or to the auxiliary-winding 212. The energy transfer is not instantaneous.

The secondary-side current $i_S$ transfers charge to the load 108 only when diode 114 is forward biased. Diode 114 is forward biased only when the reflected voltage $V_{REF\_S}$ is greater than the forward bias voltage $V_F$ of diode 114 plus the load voltage $V_{LD}$. The forward bias voltage $V_F$ of diode 114 is generally less than or equal to 1V, such as 0.7V. The auxiliary power controller 208 controls the reflected voltage across the auxiliary-winding 212 by controlling the auxiliary power supply control circuitry 214. In at least one embodiment, when the auxiliary power supply controller 208 asserts the auxiliary voltage control signal AUXCNTL, the auxiliary power supply control circuitry 214 provides a low impedance path from the auxiliary-winding 212 to the node 216. The low impedance path keeps the reflected voltage $V_{REF\_A}$ at the voltage level $V_{DD}$ across the capacitor 218. The auxiliary power supply controller 208 controls the auxiliary power supply control circuitry 214 so that when energy is transferred from the primary-winding 110 to the auxiliary-winding 212, the reflected voltage $V_{REF\_A}$ is less than the value of the forward bias voltage $V_F$ of diode 114 plus the load voltage $V_{LD}$, i.e. when the signal AUXCNTL is asserted, $V_{REF\_A} < (V_F + V_{LD})$. Thus, since the flyback voltage across the primary-winding 110 does not rise instantaneously, the reflected voltage $V_{REF\_A}$ will remain less than $(V_F + V_{LD})$ as the primary-winding 110 transfers energy to the auxiliary-winding 212. Since the reflected voltage $V_{REF\_A}$ will remain less than $(V_F + V_{LD})$, diode 114 will be reversed biased, and the secondary current $i_S$ will not flow. Thus, no charge is transferred to the load 108 when the auxiliary power supply controller 208 asserts the auxiliary voltage control signal AUXCNTL.

Conversely, in at least one embodiment, when the auxiliary power supply controller 208 deasserts the auxiliary voltage control signal AUXCNTL, the auxiliary power supply control circuitry 214 raises an impedance of the auxiliary power supply 204 to a value that prevents most if not all energy transfer to the auxiliary-winding 212. Thus, the primary-winding 110 transfers all energy to the secondary-winding 116. The auxiliary power supply control circuitry 214 raises an impedance of the auxiliary power supply 204 by causing the FET 320 to stop conducting and become an open circuit between the diode 324 and the capacitor 218. When all energy is transferred to the secondary-side winding, the diode 114 is forward biased, and the secondary-side current $i_S$ delivers all the charge from the primary-winding 110 to the secondary-winding and then to the load 118. Since the auxiliary power supply controller 208 can control mutually exclusive energy transfer to the load 108 and to the auxiliary power supply 204, the controller 206 can determine very precisely the amount of charge delivered to the load 108.

When all energy is transferred to the secondary-winding 116, the auxiliary power supply controller 208 controls the auxiliary power supply circuitry 214 so that the reflected voltage $V_{REF\_A}$ is less than the value of the forward bias voltage $V_F$ of diode 114 plus the load voltage $V_{LD}$, i.e. when the signal AUXCNTL is asserted, $V_{REF\_A} < (V_F + V_{LD})$. Thus, since the flyback voltage across the primary-winding 110 does not rise instantaneously, the reflected voltage $V_{REF\_A}$ will remain less than $(V_F + V_{LD})$ as the primary-winding 110 transfers energy to the auxiliary-winding 212. Since the reflected voltage $V_{REF\_A}$ will remain less than $(V_F + V_{LD})$, diode 114 will be reversed biased, and the secondary current $i_S$ will not flow. Thus, no charge is transferred to the load 108 when the auxiliary power supply controller 208 asserts the auxiliary voltage control signal AUXCNTL.

The reflected voltage $V_{REF\_S}$ is determined in accordance with Equation 1:

$$V_{REF\_S} = V_{LD} * N1 \quad \text{Equation 1}$$

$V_{REF\_S}$ is the reflected voltage due to the secondary-winding 116, $V_{LD}$ is the voltage across the load 108, and N1 is the turns ratio between the secondary-winding 116 and the primary-winding 110.

The reflected voltage $V_{REF\_A}$ when the auxiliary power supply control signal AUXCNTL is asserted is determined in accordance with Equation 2:

$$V_{REF\_A} = V_{DD} * N2 \quad \text{Equation 2}$$

$V_{REF\_A}$ is the reflected voltage due to the auxiliary-winding 212 of the auxiliary power supply 204, $V_{DD}$ is the voltage across the auxiliary power supply 204 when the auxiliary power supply control signal AUXCNTL is asserted, and N2 is the turns ratio between the auxiliary-winding 212 and the primary-winding 110.

The controller 206 operates from a supply voltage $V_{DD}$, and the auxiliary power supply 204 provides the supply voltage $V_{DD}$ during at least post-startup operation of the controller 206. During operation of the auxiliary power supply 204, the auxiliary power supply current $i_{AUX}$ charges node 216 to voltage $V_{DD}$. The supply capacitor 218 stores charge to maintain an approximately constant supply voltage $V_{DD}$ for controller 206. When the auxiliary power supply 204 is not operating, the controller 206 depletes charge from capacitor 218, and the voltage $V_{DD}$ decreases. The rate of decrease of charge from capacitor 218 varies as the power demands of controller 206 vary. In at least one embodiment, when the voltage $V_{DD}$ decreases below a predetermined threshold level, the auxiliary power supply controller 208 asserts the auxiliary power supply control signal AUXCNTL to activate the auxiliary power supply 204. Upon activation, the auxiliary power supply 204 receives energy from the primary-side winding 110 during a flyback period of the transformer 112. By actively controlling the auxiliary power supply 204 and isolating charge transfer to the load 108 from charge transfer to the auxiliary power supply 204, in at least one embodiment, the controller 206 controls and, is thus aware of, when the auxiliary power supply 204 receives charge and when the secondary-winding 116 is not receiving charge. Thus, the controller 206 can determine with a high degree of precision the amount of charge delivered to the load 108.

In at least one embodiment, the controller 206 controls switch 210 so that the switching power converter 104 transfers charge to the secondary-winding 116 until a predetermined charge target ($Q_{target}$) is met. Controller 206 determines the amount of charge transferred in each cycle of the switch 210 in accordance with Equation 3:

$$Q_{transferred} = \left(\frac{N1}{2}\right) \times I_{peak} \times T_2 \quad 3$$

N1 is the turns ratio between the secondary-winding 116 and the primary-winding 110, $I_{peak}$ is the peak value of the primary-side current $i_P$, and $T_2$ is the off time of switch 210 until the primary-side current $i_P$ decays to zero or until a new cycle of the control signal CS begins, whichever occurs first. Controller 206 determines the accumulated, transferred charge for 1 through M cycles of the input voltage $V_{IN}$ in accordance with Equation 4, where M is a positive integer:

$$Q_{total\_transferred} = \sum_{1}^{M} \left(\frac{N1}{2}\right) \times I_{peak} \times T_2 \quad \text{Equation 4}$$

Controller 206 continues to transfer charge to the secondary-winding 116 until the accumulated, transferred charge equals $Q_{target}$. By isolating the transfer of charge to the secondary-winding 116 and the auxiliary-winding 212, the controller 206 can determine precisely the accumulated amount of charge transferred to the load 108. Thus, the amount of charge transferred to the load 108 is not affected by the amount of charge transferred to the auxiliary power supply 204.

The manner of generating the control signal CS is a matter of design choice. In at least one embodiment, the control signal CS is generated as described in U.S. patent application Ser. No. 12/919,086, entitled "Primary-Side Control of a Switching Power Converter With Feed Forward Delay Compensation", inventors Zhaohui He, et al., and filing date Jun. 1, 2012, which is hereby incorporated by reference in its entirety.

Figure 3:
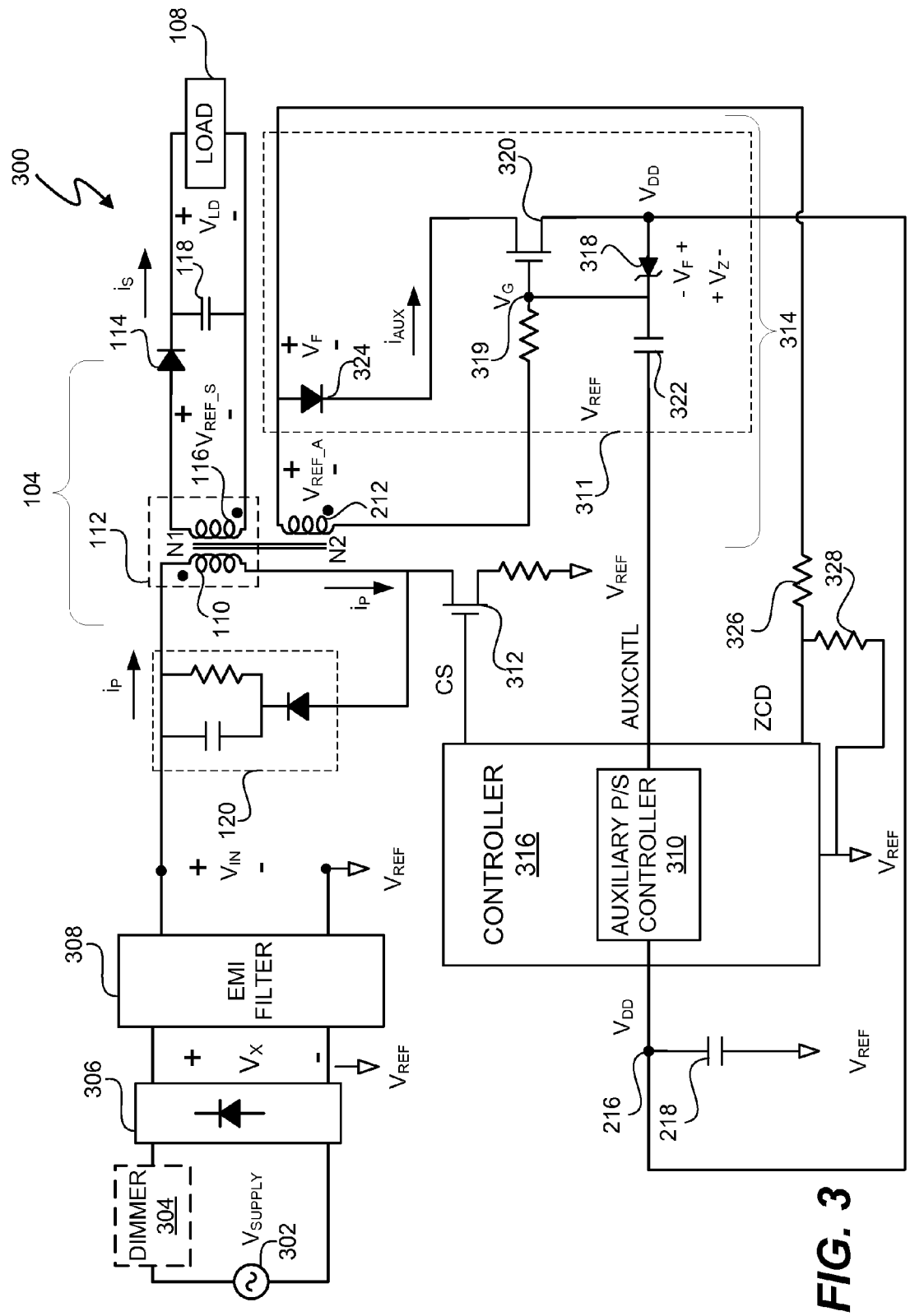
FIG. 3 depicts an embodiment of the electronic system of FIG. 3.

FIG. 3 depicts an electronic system 300, which represents one embodiment of the electronic system 200. Voltage source 302 generates a supply voltage $V_{SUPPLY}$, such as a nominally 60 Hz/110 V alternating current (AC) line voltage in the United States of America or a nominally 50 Hz/220 V AC line voltage in Europe and the People's Republic of China. An optional dimmer 304, such as a triac-based dimmer, phase cuts the supply voltage $V_{SUPPLY}$, and full-bridge rectifier 306 generates a rectified AC voltage $V_X$ as an input voltage to electromagnetic interference (EMI) filter 308. Voltage $V_{IN}$ represents the input voltage to the flyback switching power converter 104. The flyback switching power converter 104 operates as previously described.

The electronic system 300 controls the transfer of energy from the primary-winding 110 of the transformer 112 to the secondary-winding 116 and to the auxiliary-winding 212 for the auxiliary power supply 314 during mutually exclusive periods of time by at least controlling a first value of the reflected voltage $V_{REF\_A}$ across the auxiliary-winding 212 to be lower than the reflected voltage $V_{REF\_S}$ across the secondary-winding 116 during transfer of energy to the auxiliary-winding 212. The electronic system 300 also controls the value of the reflected voltage $V_{REF\_A}$ to be greater than the reflected voltage $V_{REF\_S}$ during transfer of energy to the secondary-winding 116. Since transfer of energy to the secondary-winding 116 and to the auxiliary-winding 212 occurs during mutually exclusive periods of time, the controller 316 can precisely determine the accumulated amount of charge transferred to the secondary-winding 116 in accordance with Equation 4.

Figure 4:
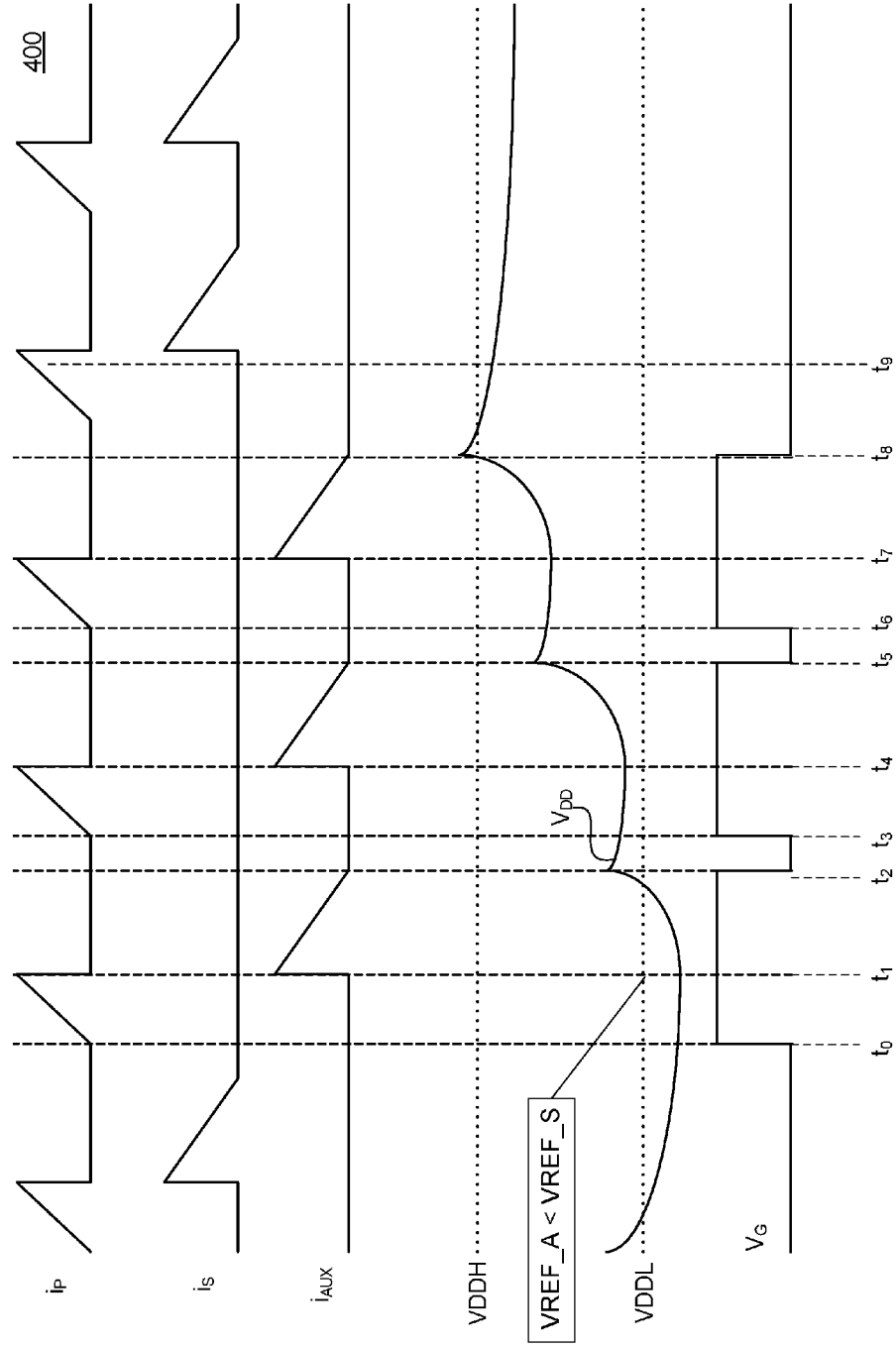
FIG. 4 depicts exemplary waveforms for the electronic system of FIG. 3.

FIG. 4 depicts exemplary waveforms 400 during the operation of electronic system 300. Referring to FIGS. 3 and 4, the auxiliary power supply controller 310 controls the auxiliary power supply control circuitry 311. The auxiliary power supply control circuitry 311 represents one embodiment of the auxiliary power supply control circuitry 214. Auxiliary power supply controller 310 controls the reflected voltage $V_{REF\_A}$ by asserting and deasserting the auxiliary power supply control signal AUXCNTL. In at least one embodiment, a deasserted auxiliary power supply control signal AUXCNTL is approximately 0V. Prior to time $t_0$, the auxiliary power supply control signal AUXCNTL is 0V, and the Zener diode 318 is forward biased and has a normal forward voltage drop $V_F$ of less than or equal to +1V. The gate 319 of the FET 320 is a current control node of the FET 320. Prior to time $t_0$, the gate voltage $V_G$ of FET 320 equals $V_{DD}$-$V_F$. Since the gate voltage $V_G$ is less than the source voltage $V_{DD}$ of FET 320, FET 320 does not conduct during a deassertion of auxiliary power supply control signal AUXCNTL. The impedance of the auxiliary power supply 314 is virtually infinity due to the open circuit of nonconducting FET 320, and, thus, the auxiliary current $i_{AUX}$ is zero, and no energy is transferred to the auxiliary power supply 314.

Thus, when the auxiliary power supply controller 310 deasserts the auxiliary power supply control signal AUXCNTL, flyback switching power converter 104 transfers all the energy from the primary-winding 110 to the secondary-winding 116.

In at least one embodiment, the system 300 also optionally includes a voltage divider configured from resistors 326 and 328. In at least one embodiment, the voltage divider has a relatively high impedance and conducts a negligible amount of current. Signal ZCD represents the voltage across resistor 328, and the signal ZCD is used by the controller to detect a zero crossing in the input voltage $V_{IN}$.

In at least one embodiment, the auxiliary power supply controller 310 is a hysteretic controller, such as the hysteretic controller in FIG. 5, and determines when to assert and deassert the auxiliary power supply control signal AUXCNTL. In at least one embodiment, the auxiliary power supply controller 310 asserts the auxiliary power supply control signal AUXCNTL when the supply voltage $V_{DD}$ falls below a minimum voltage threshold level VDDL, and deasserts the auxiliary power supply control signal AUXCNTL when the supply voltage rises above a maximum voltage threshold level VDDH. The difference between the values of VDDH and VDDL is a matter of design choice. Additionally, in at least one embodiment, to maintain a tighter control of the supply voltage $V_{DD}$, the auxiliary supply controller 310 maintains the supply voltage $V_{DD}$ approximately constant.

At time $t_0$, the supply voltage $V_{DD}$ has dropped below a minimum threshold voltage value VDDL, and auxiliary power supply controller 310 asserts the auxiliary power supply control signal AUXCNTL. An asserted auxiliary power supply control signal AUXCNTL has a value of $V_{DD}$, which shifts the voltage across capacitor 322 and reverse biases the Zener diode 318. The Zener voltage Vz of Zener diode 318 is greater than the threshold voltage of the FET 320. Thus, when the Zener diode 318 is reverse biased, the gate voltage $V_G$ rises to near $V_{DD}$+Vz, such as +12V, and the FET 320 conducts. When the FET 320 conducts, a low impedance current path for auxiliary current $i_{AUX}$ is available through diode 324 and FET 320. At time $t_0$, control signal CS is a logical one, and FET 312 conducts the primary current $i_P$ through the primary-winding 110.

At time $t_1$, the primary current $i_P$ reaches a peak value, control signal CS deasserts to a logical zero, and the primary-winding voltage reverses. When the primary-winding voltage reverses, the low impedance path through diode 324 and FET 320 causes the reflected voltage reflected voltage $V_{REF\_A}$ to be approximately $V_{DD}$ plus the forward biased diode voltage drop $V_F$ across diode 324. When the reflected voltage $V_{REF\_A}$ equals N2·$V_{DD}$+$V_F$, the reflected voltage $V_{REF\_A}$ is less than the reflected voltage $V_{REF\_S}$. Accordingly, the primary-winding 110 transfers all energy to the auxiliary power supply 314. As energy and, thus, charge is transferred to the auxiliary power supply 314, the auxiliary current $i_{AUX}$ charges the node 216 and capacitor 218. Charge is transferred to the node 216 until the auxiliary current $i_{AUX}$ decreases to 0 at time $t_2$. The supply voltage $V_{DD}$ decreases between times $t_2$ and $t_3$ as the controller 316 utilizes charge stored by capacitor 218. Between times $t_3$ and $t_8$, the process of transferring charge only to the auxiliary power supply 314 continues.

At time $t_8$, the auxiliary power supply controller 310 detects that the supply voltage $V_{DD}$ is greater than a maximum threshold voltage value VDDH. After the supply $V_{DD}$ is equal to or greater than the maximum threshold voltage value VDDH and all the present amount of charge on the primary-winding 110 has been transferred to the auxiliary-winding, the auxiliary power supply controller 310 deasserts the auxiliary power supply control signal AUXCNTL to approximately 0V. Deasserting the auxiliary power supply control signal AUXCNTL forward biases the Zener diode 318, which causes FET 320 to stop conducting the auxiliary current $i_{AUX}$. Then, as previously described, during a flyback period when the primary-winding voltage reverses at, for example, time $t_9$, the primary-winding 110 transfers all energy to the secondary-winding 116. Transferring all the energy from the primary-winding 110 to the secondary-winding 116 continues until the auxiliary power supply controller 310 again detects that the supply voltage $V_{DD}$ has decreased below the minimum voltage threshold value VDDL. Then the process as described between times $t_0$ and $t_8$ repeats. The frequency of the pulses of the gate voltage is a matter of design choice. In at least one embodiment, the frequency is at least 10 kHz, and in at least one embodiment, the frequency is at least 20 kHz.

FIG. 5 depicts an auxiliary power supply controller 500, which represents one embodiment of the auxiliary power supply controller 310. The auxiliary power supply controller 500 is a hysteretic controller and includes two comparators 502 and 504 to respectively compare the supply voltage $V_{DD}$ with the maximum voltage threshold value VDDH and the minimum voltage threshold value VDDL. The output C0 of comparator 502 is a logical 1 until the supply voltage $V_{DD}$ is greater than the maximum voltage threshold value VDDH. When the supply voltage $V_{DD}$ is less than the maximum voltage threshold value VDDH, the output C0 is a logical 0. The output C1 of comparator 504 is a logical 1 until the supply voltage $V_{DD}$ is less than the minimum voltage threshold value VDDL. When the supply voltage $V_{DD}$ is less than the minimum voltage threshold value VDDH, the output C0 is a logical 1. Thus, when the output C0 transitions from a logical 1 to a logical 0, the logic module 506 asserts the auxiliary power supply control signal AUXCNTL as a value equal to $V_{DD}$. When the output C1 transitions from a logical 1 to a logical 0, the logic module 506 deasserts the auxiliary power supply control signal AUXCNTL as a value equal to approximately 0V. Thus, the auxiliary power supply controller 500 functions as a hysteretic controller to control the value of auxiliary power supply control signal AUXCNTL and, thereby, control the auxiliary power supply circuitry 311.

Thus, the electronic system controls the transfer of energy from a primary-winding of a flyback switching power converter to a secondary-winding and to an auxiliary-winding for an auxiliary power supply 314 during mutually exclusive periods of time. Thus, the electronic system can, in at least one embodiment, precisely determine an amount of charge transferred to the secondary-winding and then to a load.

Although embodiments have been described in detail, it should be understood that various changes, substitutions, and alterations can be made hereto without departing from the spirit and scope of the invention as defined by the appended claims.

What is claimed is:

1. A method comprising:
    transferring energy, in accordance with a control signal provided from a controller, from a primary winding of a transformer of a switching power converter to a secondary-winding and to an auxiliary-winding for an auxiliary power supply during mutually exclusive first and second periods of time by at least controlling a value of a reflected voltage of the auxiliary-winding of the transformer to be lower than a reflected voltage of the secondary-winding of the transformer during transfer of energy to the auxiliary-winding during the first period of time and controlling an impedance of the auxiliary power supply to transfer energy to the secondary-winding without transferring energy to the auxiliary power supply during the second period of time, wherein the auxiliary power supply having the auxiliary-winding provides auxiliary power to the controller that provides the control signal to control the transferring of energy from the primary-winding, and the secondary-winding delivers energy for a load, other than the controller, of the switching power converter.

2. The method of claim 1 further comprising:
    controlling one or more switches coupled to the auxiliary-winding to isolate energy transfer to the auxiliary-winding from energy transfer to the secondary-winding.

3. The method of claim 2 wherein controlling one or more switches coupled to the auxiliary-winding to isolate energy transfer to the auxiliary-winding from energy transfer to the secondary-winding comprises:
    causing the one or more switches to conduct current flow in the auxiliary-winding of the transformer; and
    causing the one or more switches to stop conducting current flow in the auxiliary-winding of the transformer and allow current to flow in the secondary-winding of the transformer.

4. The method of claim 1 further comprising:
    determining when to provide energy from the auxiliary-winding of the transformer to a device; and
    causing energy to be transferred from the auxiliary-winding of the transformer upon determining when to provide energy from the auxiliary-winding of the transformer to the device.

5. The method of claim 4 wherein the device comprises a switching power converter controller.

6. The method of claim 4 wherein determining when to provide energy from the auxiliary-winding of the transformer to a device comprises:
    monitoring a supply voltage node to the device;
    when the supply voltage decreases below a first threshold value, then causing energy to be transferred from the auxiliary-winding of the transformer upon determining when to provide energy from the auxiliary-winding of the transformer to the device.

7. The method of claim 6 further comprising:
    determining when to stop transferring energy from the primary-winding of the transformer to an auxiliary-winding of the transformer.

8. The method of claim 7 wherein determining when to stop transferring energy from the primary-winding of the transformer to an auxiliary-winding of the transformer comprises:
    monitoring a supply voltage node to the device; and
    when the supply voltage increases above a second threshold value, then causing energy to stop transferring to the auxiliary-winding of the transformer.

9. The method of claim 8 wherein the first threshold value is less than the second threshold value.

10. The method of claim 1 wherein the first and second periods of time comprise successive switching cycles of a switch that controls the transferring of energy from the primary-winding.

11. An apparatus comprising:
    a controller to at least control a transfer of energy, in accordance with a control signal provided from a controller, from a primary winding of a transformer of a switching power converter to a secondary-winding and to an auxiliary-winding for an auxiliary power supply during mutually exclusive first and second periods of time by at least controlling a value of a reflected voltage of the auxiliary-winding of the transformer to be lower than a reflected voltage of the secondary-winding of the transformer during transfer of energy to the auxiliary-winding during the first period of time and controlling an impedance of the auxiliary power supply to transfer energy to the secondary-winding without transferring energy to the auxiliary power supply during the second period of time, wherein the auxiliary power supply having the auxiliary-winding provides auxiliary power to the controller that provides the control signal to control the transfer of energy from the primary-winding, and the secondary-winding delivers energy for a load, other than the controller, of the switching power converter.

12. The apparatus of claim 11 wherein the controller is further configured to:
control one or more switches coupled to the auxiliary-winding to isolate energy transfer to the auxiliary-winding from energy transfer to the secondary-winding.

13. The apparatus of claim 12 wherein to control one or more switches coupled to the auxiliary-winding to isolate energy transfer to the auxiliary-winding from energy transfer to the secondary-winding, the controller is further configured to:
cause the one or more switches to conduct current flow in the auxiliary-winding of the transformer; and
cause the one or more switches to stop conducting current flow in the auxiliary-winding of the transformer and allow current to flow in the secondary-winding of the transformer.

14. The apparatus of claim 13 wherein the device comprises a switching power converter controller.

15. The apparatus of claim 11 wherein the controller is further configured to:
determine when to provide energy from the auxiliary-winding of the transformer to a device; and
cause energy to be transferred from the auxiliary-winding of the transformer upon determining when to provide energy from the auxiliary-winding of the transformer to the device.

16. The apparatus of claim 15 wherein to determine when to provide energy from the auxiliary-winding of the transformer to a device, the controller is further configured to:
monitor a supply voltage node to the device;
when the supply voltage decreases below a first threshold value, then cause energy to be transferred from the auxiliary-winding of the transformer upon determining when to provide energy from the auxiliary-winding of the transformer to the device.

17. The apparatus of claim 16 wherein the controller is further configured to:
determine when to stop the transfer energy from the primary-winding of the transformer to an auxiliary-winding of the transformer.

18. The apparatus of claim 17 wherein to determine when to stop the transfer of energy from the primary-winding of the transformer to an auxiliary-winding of the transformer, the controller is further configured to:
monitor a supply voltage node to the device; and
when the supply voltage increases above a second threshold value then cause energy to stop transferring to the auxiliary-winding of the transformer.

19. The apparatus of claim 18 wherein the first threshold value is less than the second threshold value.

20. The apparatus of claim 11 wherein the periods of time comprise successive switching cycles of a switch that controls the transferring of energy from the primary-winding.

* * * * *